United States Patent [19]

Bareis

[11] Patent Number: 4,856,945
[45] Date of Patent: Aug. 15, 1989

[54] IN-SITU PORTABLE BORING-REAMING SYSTEM

[76] Inventor: Robert Bareis, R.D. 1, Box 374, Altamont, N.Y. 12009

[21] Appl. No.: 199,769

[22] Filed: May 27, 1988

[51] Int. Cl.$^4$ .............................................. B23B 47/28
[52] U.S. Cl. ................................... 408/72 R; 408/88; 408/234
[58] Field of Search ............... 408/54, 72 R, 79, 88, 408/92, 97, 103, 108, 115 R, 234, 237, 131; 175/62

[56] References Cited

U.S. PATENT DOCUMENTS

| | | |
|---|---|---|
| 681,375 | 8/1901 | Reed .................................. 408/72 R |
| 1,417,278 | 5/1922 | Peters . |
| 2,074,459 | 3/1937 | Cole et al. ....................... 408/239 R |
| 2,274,964 | 3/1942 | James . |
| 2,439,492 | 4/1948 | Sharratt et al. ....................... 408/54 |
| 3,751,175 | 8/1973 | Brooks .............................. 408/72 R |
| 4,213,721 | 7/1980 | Aldridge, Jr. ........................ 408/54 |
| 4,451,186 | 5/1984 | Payne ................................... 408/54 |
| 4,533,284 | 8/1985 | Agius et al. ............................ 408/92 |
| 4,580,931 | 4/1986 | Wilger et al. ....................... 408/72 R |

Primary Examiner—Gil Weidenfeld
Assistant Examiner—Daniel W. Howell
Attorney, Agent, or Firm—Schmeiser, Morelle & Watts

[57] ABSTRACT

A portable, in-situ, omni-directional orientable assembly for refurbishing a bore in a workpiece and including a cutting bar with various tool holding options, a main jig assembly for effecting azimuthal alignment, rotation and translation of the cutting bar and various journaling options, including non-journaled operation. The cutting bar is an elongate rigid bar which has multiple chambers for holding cutting tools in addition to a removeable, toroidal tool holding adjunct that is slidable on the cutting bar and lockable to the bar by the insertion of a key into mutual longitudinal keyways provided in the cutting bar and the toroidal tool holding adjunct. A main jig holding rotary drive means provides omni-directional alignment capability and adaptability for transferring the rotary motion, as well as translational motion, to the cutting bar. The cutting bar may or may not be journaled; but if journaling of the bar is desired, a portable pillow block assembly is provided. The pillow block is detachable from its portable jig assembly and may be used independently, and in plurality, as the means for journaling the cutting bar.

13 Claims, 6 Drawing Sheets

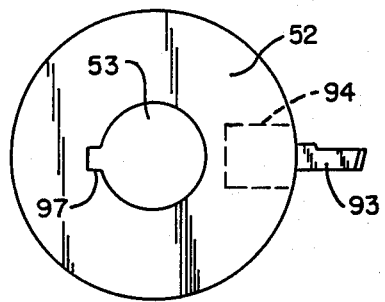
FIG. 6
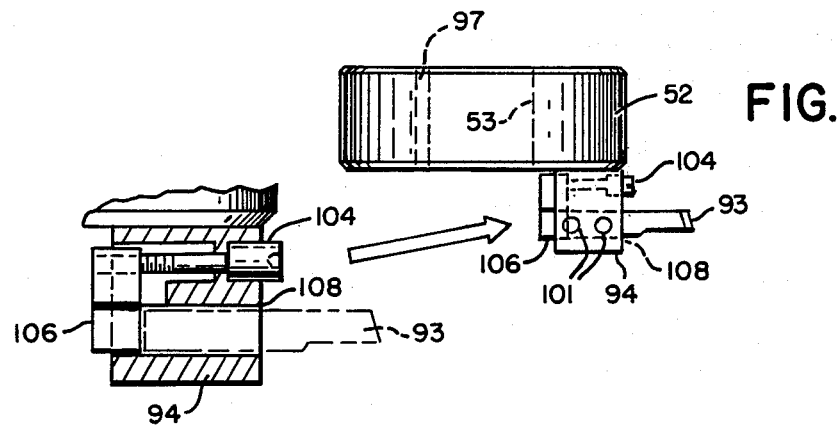
FIG. 7
FIG. 8
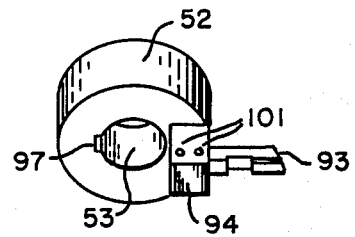
FIG. 9

IN-SITU PORTABLE BORING-REAMING SYSTEM

FIELD OF THE INVENTION

The present invention relates generally to machines that are used for auguring, boring, drilling and reaming earth, metal and wood workpieces. More specifically, the instant invention is a portable borer-reamer which may be transported and set up to resurface bearing bores or sleeves by reaming, or realign by boring, any number of coaxially, linearly disposed bearing ports, sleeves or bores. The invention provides its principal benefit by allowing true in-situ refurbishment of bearing bores or bushings that are located in heavy, earth-moving equipment such as loader frames and loader buckets.

BACKGROUND OF THE INVENTION

During most field support operations, it is frequently necessary to disassemble ponderous, heavy equipment and transport it to a machine shop in order to refit joint and pivot elements of articulating parts with new bearing bores, bearings or bearing sleeves. It is only at large machine shops or refurbishing plants that the equipment necessary to reestablish bore alignment in such jointed or articulating machinery is found; most often a large, horizontal mill borer must be used. Such machinery is necessitated by the need to reestablish smooth bores or bushing surfaces that are aligned, axially and concentrically, so that new bearings or bearing sleeves may be refitted. In most instances, especially with the advent of high volume loader buckets, individual boring, reaming or rigorous honing cannot be accomplished effectively and efficiently and a ganged operation, such as the placement of multiple tools on a single coaxial alignment shaft, is employed. Another very severe drawback in the present art, as it relates to the aforementioned heavy equipment, is the inability of any apparatus known to the inventor that will effectively rebore a plurality of eccentrically worn bearing bores, in whatever orientation the loader arm or bucket arm has been grounded. In situations where the equipment is still removed to the refurbishing plant, this is of no consequence because, after going to the expense, time and energy to remove the work piece, proper orientation of it on a horizontal mill borer becomes but an adjunct function.

The instant inventor has long sought to overcome the necessity of removing heavy equipment to a machine shop or a refurbishment plant. Others, also, have sought to overcome the problem and to this end they, and the instant inventor, developed in-situ machines for refurbishing bores, especially bearing bores, in a workpiece. Precursors to the modern, in-situ boring machine comprised numerous portable boring machines that employed hand drills to rotate boring bars. The limitations inherent in such devices were, to those skilled in this art, intuitively obvious because such portable devices failed to provide the accuracy necessary to refurbish a plurality of worn, axially aligned bores. This problem stemmed primarily from the difficulty encountered in first achieving, and subsequently maintaining, alignment of the hand drill with the original common bore alignment axis.

To resurface and realign a plurality of worn bores that are disposed in-line, i.e. the true centers of the original holes were coaxially aligned, a machining system is required that may be easily mounted on or about the various types of equipment in-situ. A current state of the art machine claiming such facility was disclosed in U.S. Pat. No. 4,580,931, which issued to Wilger et al, on Apr. 8, 1986. Wilger describes and discloses what he terms an in-situ machine for refurbishing a bore in a workpiece. The invention includes a shaft which is adapted to be fixed to the workpiece in axial alignment therewith and a tubular boring element concentrically mounted for rotation about the shaft, adapted to extend into the workpiece bore. Mounted on the boring element for reciprocal movement therealong is a cutting head. By one device, the cutting means is rotated while another device, responsive to the rotator device, is employed to advance the cutter head along the tubular boring element. The Wilger device is mounted in-place to a pair of bearing bores; but the alignment, and even the apparatus disclosed, cannot be reasonably extrapolated for use with a multiplicity of bores that, although having originally been in coaxial alignment, have suffered such spalling, burnishing, erosion and even elliptical distortion of the workpiece surface to the extent that reasonable refurbishment could possibly require the establishment of a new common axis of alignment. Further, and what is most evident from the analysis of the Wilger invention, an attempt to translate a cutting tool over a very lengthy working axis, with the attachment only to surfaces of the workpiece, would induce deflection of either the tubular boring element or the fixed shaft's thrust bearing, resulting in an eccentric bore or possible nonconcentricity of one or more of the bores in a plurality. This problem stems primarily, in the general case, from the fact that most heavy equipment bearing holders or bushings are not perpendicular to the forks, tongues or flanges of the equipment joints. Oftentimes, the joint elements bearing the bores are cast and their external surfaces are not parallel or they are, at best, irregular. The problem also stems from the reason that very heavy loader arms may be grounded so that the outside of one of the bores is almost touching the ground. Thus, a portable borer (such as the invention of U.S. Pat. No. 4,589,931 cannot be clamped to the exterior surfaces of the equipment that is in close ground proximity.

Wilger could have overcome this latter deficiency, that of being unable to bore essentially downward (since the bore containing arm or flange is "grounded"), by providing a means for stabilizing his tubular boring element shaft with reference to the grounded arm/flange. The instant inventor has devised a boring shaft which can be journaled in a pillow block, a moveable pillow block, to overcome the Wilger device's most significant deficiency. The pillow block is mounted either on a second portable jig or, to provide an inside stabilization vis-a-vis the grounded arm/flange, is tack-welded to the arm/flange's inside surface, superposed on the outer bore.

The instant inventor has further determined that, in addition to a device that would resurface and realign a plurality of worn bores on various types of equipment in-situ, a cutting means must be provided that readily lends itself to the resurfacing of a variable number of worn bores without the necessity of successive and repetitive, as well as time consuming, alignments. Proper alignment, being of paramount consideration in a boring-reaming operation, a portable boring machine must inculcate means that would allow it to be omni-directionally aligned. An omni-directionally alignable base jig mechanizes such a means.

SUMMARY OF THE INVENTION

The instant invention is a portable boring-reaming machine useful for resurfacing and realigning multiple, essentially coaxially aligned worn bores in heavy equipment where such equipment does not lend itself to easy removal to the workshop. Worn bearing housings or bearing bores on heavy equipment such as rollers, loader frames, loader buckets, tracked vehicles and the like, may be repaired accurately and expeditiously in-situ. The basic invention comprises: a first alignment jig assembly and an optional pillow block with or without a second jig, the first jig providing motivation and alignment for cutting shaft, tool mounts and holders, and the second providing pillow block bearing support means and alignment; a cutter bar for mounting thereon a plurality of cutting tools either afixed by independent cutter holders or inserted directly into the cutter bar; and, various alignment adjuncts such as alignment cones and translatable platform subassemblies; the latter may be afixed to and/or part of the jig assemblies.

Operational use of the invention begins with cutting bar alignment. Alignment cones are generally set on the bar and the apparatus is brought into registry with a pair of outside bores of the forked arm, flange or track apparatus, the bores of which are to be honed or rebored. By physical manipulation, the cones are inserted into the bores or bearing sleeves from the insides of the fork arm, apex or apices first. As the cones settle into the bores or sleeves, they find the common center which is "trued", that is, aligned with any intervening interior bores, by the shaft which is passing longitudinally through the centers of the alignment cones. At this point, course alignment of the main jig is accomplished by bringing it into position so as to be set at the outside of the more conveniently located outside bore and the shaft rotating mechanism is attached thereto. The shaft rotating mechanism is aligned azimuthaly by the use of three tripod leveling jacks in the main jig, as well as physical movement of the tripod, left or right, and translated in vertical and horizontal directions by an interacting, coupled pair of dove tailed, screw operated, table platform assemblies. Depending upon the necessity of fixing the free end of the cutting bar, the operator may choose to use a second jig, having mounted thereon a pillow block-type bearing in which to journal the shaft; such a bearing pillow block being mounted on essentially the same type of azimuthal alignment and translating, interconnected (dove tailed) tables as associated with the main jig. An alternative presents itself in the instant invention should the operator eschew the portable, second jig assembly. Optional pillow block bearings, capable of spanning any bearing bore or sleeve may be fitted to the opposite outer bore or sleeve from the main jig-adjacent sleeve, not by actual attachment to the sleeve, but by tack welding or C-clamping the pillow block assembly to either the inside or the outside of the bore frame. Those having ordinary skill in the art, upon viewing the detailed description of the invention which follows, will readily discern that both main jig and pillow block bearing assembly, with or without second jig basing, may be clamped to the outer flange surfaces of any workpiece. Wherever clamping may be utilized, there also tack welding may be employed.

Once the operator becomes proficient in the use of this extraordinary apparata, with its highly flexible modes of application, many such combinations of usage, using at least the main jig, may be employed. After the alignment is properly had, various routines, self evident in nature, may be used to remove the cones and/or insert on the cutting shaft a multiplicity of cutting tools. Depending upon the finished inside diameter desired, cutting tools of varying lengths may be used, directly inserted in the cutting shaft or bar, or set into an adjunct, toroidal tool holder which is then mounted to the bar. Thereafter, cutting tools in place, the bar rotation means on the main jig is employed to rotate the bar while contemporaneously advancing and retracting it so as to pass the cutting tool through the worn bores in a precisely coaxially aligned path.

BRIEF DESCRIPTION OF THE DRAWINGS

FIG. 6 is a top view of the toroidal cutting tool holder;

FIG. 7 is a side view of the toroidal cutting tool holder;

FIG. 8 is a partial sectionalized view of the tool mounting subassembly for the toroidal tool holder; and FIG. 9 is an isometric view of the toroidal tool holder with a cutting tool installed.

DETAILED DESCRIPTION OF THE INVENTION

Figure 1:
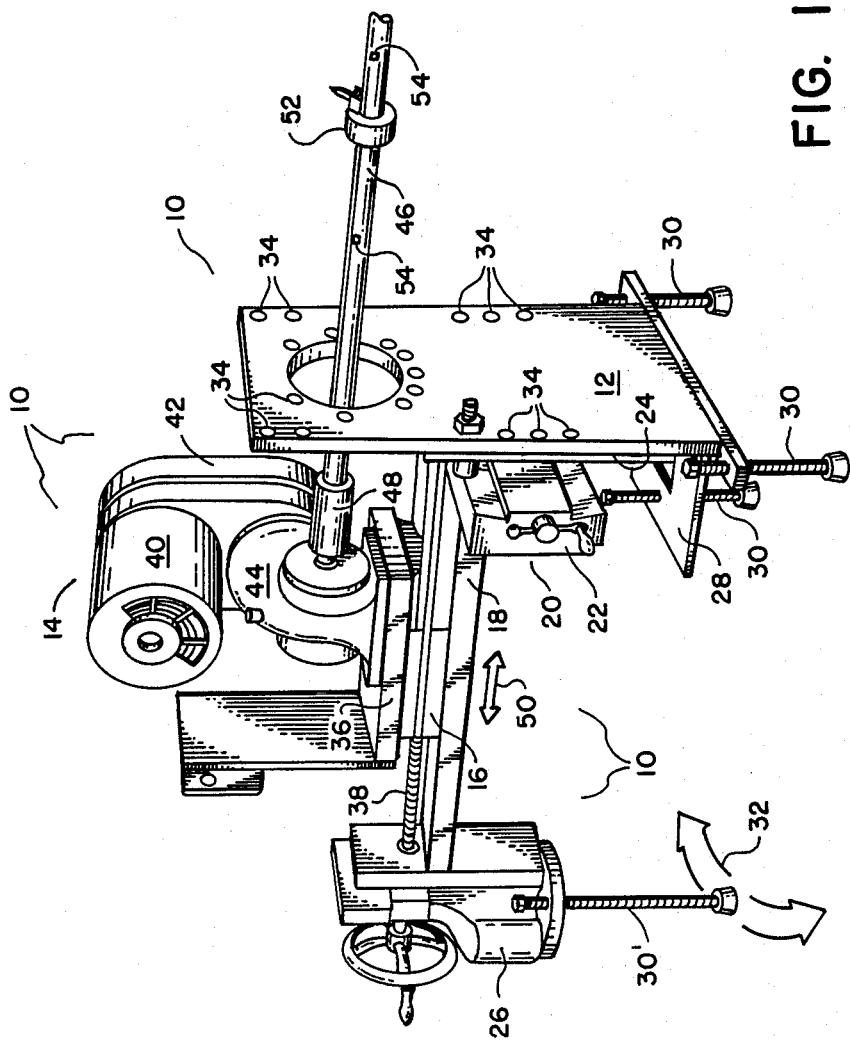
FIG. 1 is an isometric view of the first jig assembly with cutter apparatus in place.

The isometric view of the main jig assembly 10 illustrates the main functioning parts of what the inventor considers the preferred embodiment. Succinctly, the nexus of this invention comprises a main jig base plate 12 to which is mounted, by various devices a combination drive source 14 and drive source mount 16. The drive source mount 16 comprises a drive saddle 18 which is firmly afixed to a horizontal/vertical translation subassembly 20. The translation subassembly comprises a horizontal translation table 22 dove tail coupled to a vertical translation table 24; which is in turn fixedly attached to main jig base plate 12. It may be readily understood, therefore, that drive saddle 18 may be vertically and horizontally referenced to main jig base plate 12 by the horizontal and vertical movements of the horizontal/vertical translation subassembly 20.

Shown in FIG. 1, but not present on all models of the invention, is the rear jig subassembly 26, firmly fixed to the rear portion of drive saddle 18. The reader will note that main jig base plate 12 is secured to tripod base 28, which rests on three tripod jacks 30, thus being adjustable so that the normal to the main jig base plate 12 may be given any orientation, save azimuthal. As noted earlier, drive saddle 18 is firmly afixed by the translation subassembly 20 to the main jig base plate 12. Therefore, it can be said to be parallel to the normal of main jig base plate 12. Azimuthal orientation can be readily had by the left-right movement 32 of jig subassembly 26. Such movement can also be coordinated with adjustment of tripod jacks 30 and unitary jack 30' which supports the rear jig subassembly 26. Should the rear jig subassembly not be employed, and the main jig clamped or welded to a portion of the workpiece, as described in the Summary of the Invention, such alternative clamping or welding can achieve an azimuthal adjustment by the use of shim pieces inserted between the workpiece and the main jig base plate 12 at the points of contact. A plurality of holes 34 are also seen in various locations on main jig base plate 12. These holes may be tapped with bolts inserted therein; said bolts to be used as shiming devices when the alternative workpiece-mounted mode of operation, as aforementioned, is selected.

A drive table 36 is interconnected either by tongue-in-groove arrangement or similar dove tail apparatus, to drive saddle 18. It is advanced and retracted along the drive saddle by the actuation of worm drive 38; and the entire drive source 14, comprising drive motor 40, transfer gear case 42 and drive gear case 44, is mounted to drive table 36. Thus, the rotary drive for cutting bar 46, securing the bar through drive gear/bar adaptor 48 can, while rotating the bar, advance and retract it along the advance/retract axis 50 when compelled to do so by the actuation of worm drive 38. The last item of note in FIG. 1, the cutting bar 46, is viewed bearing the toroidal tool holder 52 and presenting the permanent tool receiving chambers 54, which will hereinafter be discussed in greater detail.

Figure 2:
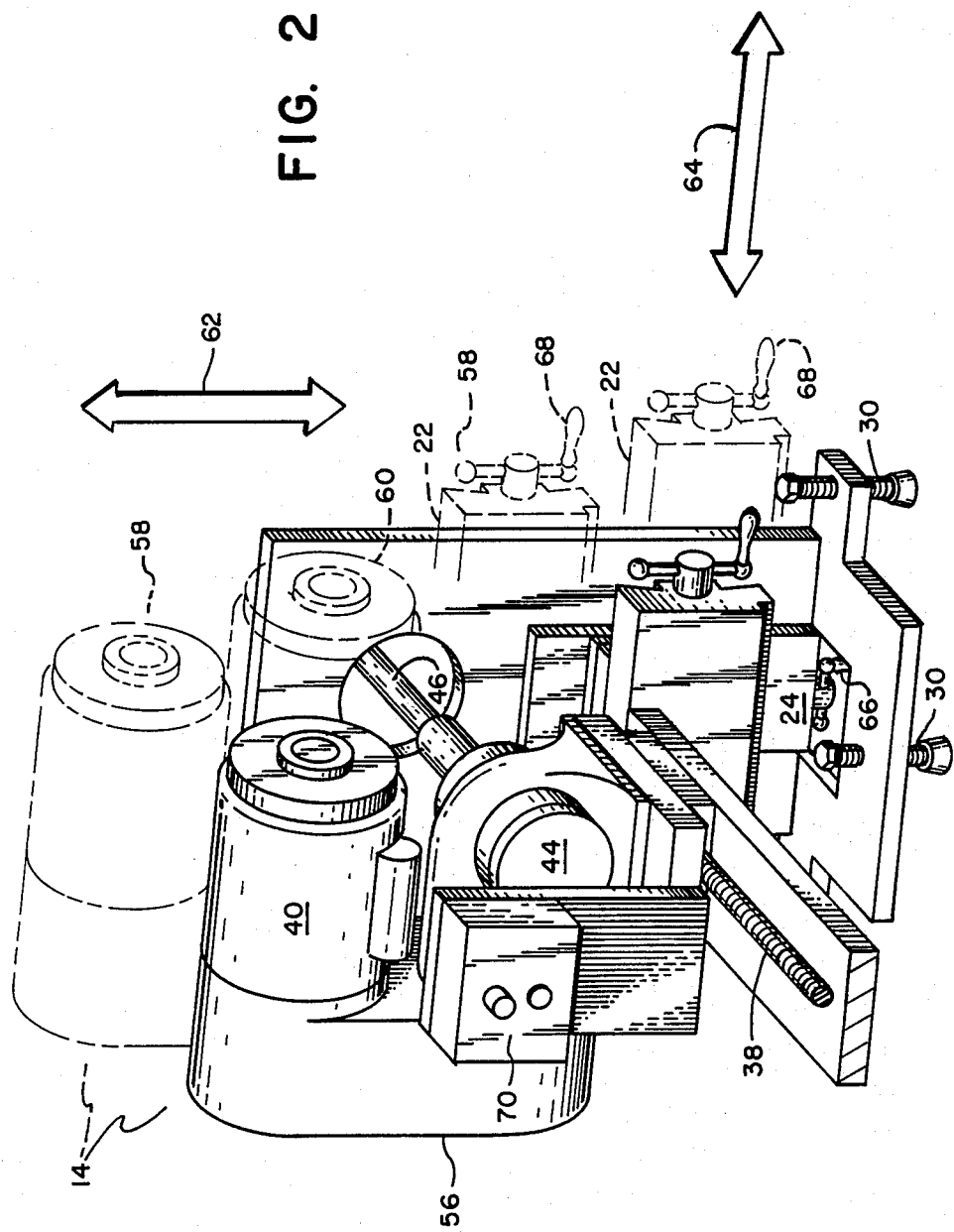
FIG. 2 is a partial isometric depiction of the main jig power and drive assembly showing, in phantom, vertical and horizontal positions.

Referring now to FIG. 2, drive source 14 is depicted solidly in a first position 56 and in phantom positions 58 and 60 which depict the vertical adjustment 62 and horizontal adjustment 64 possibilities, respectively. Here, screw adjustment handles vertical 66 and horizontal 68 provide force exertion points for movement of the vertical dovetail mounted translation table 24 and the horizontal translation table 22, respectively. On-off switch 70 is used to start the drive motor 40 which translates its power to rotate cutting bar 46.

Figure 3:
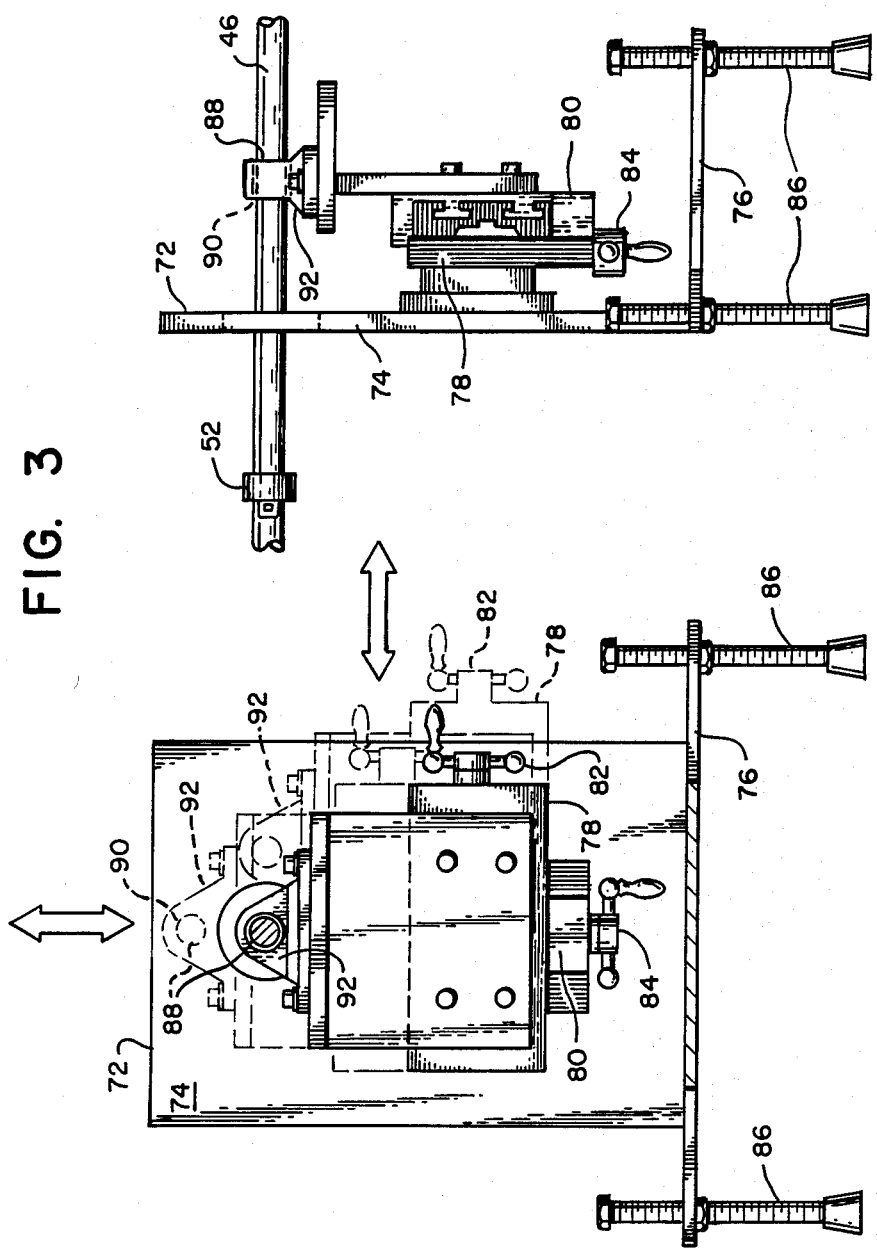
FIG. 3 is an isometric view of the pillow block basing on the secondary jig.

Although it can now be readily seen that the aforementioned main jig apparatus of FIG. 1 can be, through the use of various clamping or welding devices, used solely to orient, translate and rotate cutting bar 46, it is oftentimes necessary to provide a thrust bearing or pillow block bearing in which to journal cutting bar 46. FIG. 3 depicts an apparatus generally used to this end. The secondary jig option 72 comprises secondary jig base plate 74 which is fashioned after the main jig base plate 12. In fact, the entire secondary jig option is similar in most respects to the main jig with the exception being that a drive saddle 18 is not attached thereto; the secondary jig is a stand-alone apparatus that has as its sole function the provision of a portable, adjustable journal-type bearing platform. Continuing the viewing and explanation of FIG. 3, the observer will note that the secondary jig option comprises in addition to the base plate 74 a tripod base 76 on which are mounted, in dove tail-connected assemblage, horizontal adjustment table 78 and vertical adjustment table 80. The reader will observe that the same dove tail-connected assemblage is utilized in the main jig assembly. As with the main jig assembly, adjustment screws 82, 84 are used to translate horizontal and vertical adjustment tables 78, 80, respectively. As would be apparent to the user of the invention, secondary jig option 72 acquires its azimuthal arrangement flexibility from the fact that it can be turned 360° by manual manipulation. Adjustment to a horizontal reference is performed using tripod jacks 86, identical to those of the main assembly.

The sole function of the secondary jig option, as aforementioned, is to provide a portable, adjustable and completely stable platform for a pillow block bearing 88. In this embodiment, the pillow block bearing 88 is seen resting atop a flange of an adjustment table and contains, in transverse orientation to the pillow block flanges 92, a bearing or bushing 90.

As described in the operational setup of the foregoing Summary of the Invention, a most commonly used option for providing a journaling means for cutting bar 46 is to employ only the pillow block 88. This option, without use of the secondary jig 72, entails the clamping or tack welding of the pillow block to a workpiece. Generally, flanges 92 are employed as the points of contact for the C-clamps or the weld points.

Figure 4:
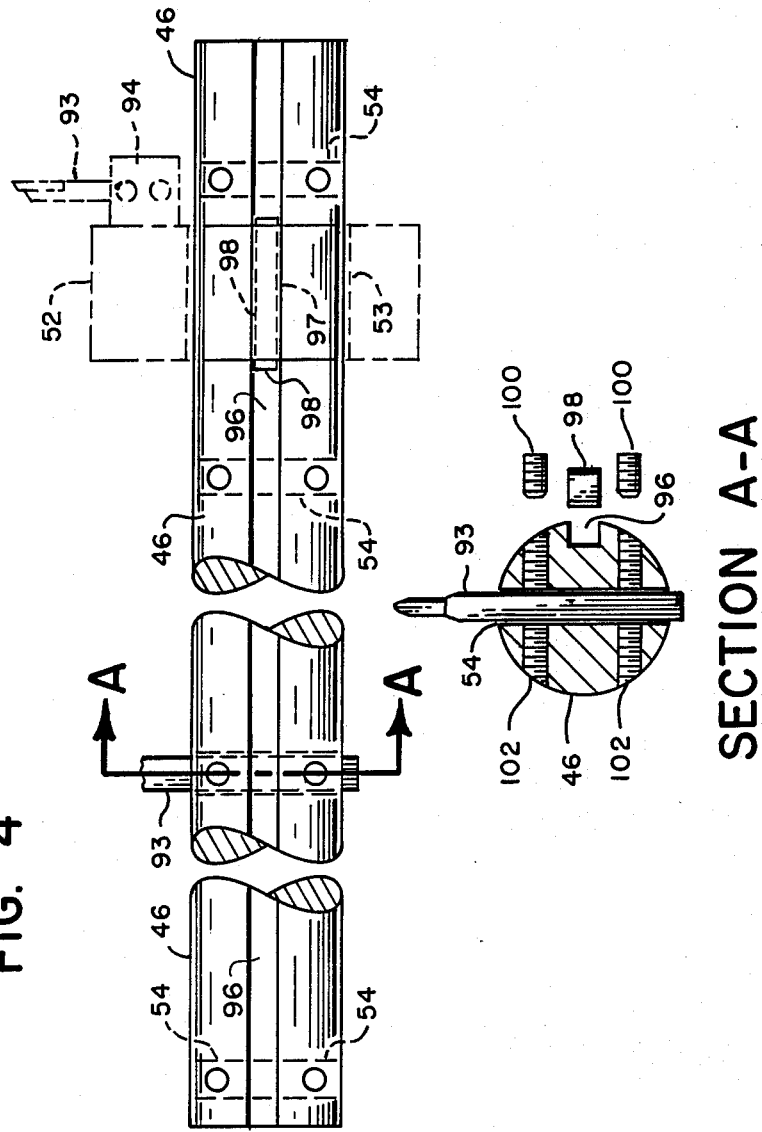
FIG. 4 is a side view with orthographic cross section of the cutting bar with cutting tool installed.

FIG. 4 is a segmented, abbreviated side elevational view of cutting bar 46 bearing toroidal holder 52 (in phantom) and a cross section of the bar at tool 93 receiving chamber 54. Referring more specifically to the upper portion of FIG. 4, the side elevation of cutting bar 46, there is portrayed the segmented bar bearing, in phantom, toroidal tool holder 52. The tool holder 52 has projecting from it, in an essentially orthogonal relationship, tool holder subassembly 94. It is the function of the subassembly 94 to retain and allow adjustment of cutting tool 93, seen in this view and projecting therefrom. Toroidal tool holder 52 has a bore 53 passing longitudinally therethrough and at least one point on the surface of bore 53 is a matching keyway 97, longitudinally cut so as to be superpositioned over a similar longitudinal keyway 96 that is present in cutting bar 46. Reference to the lower picture of FIG. 4, section A—A, depicts key 98, a short, rectangular piece of stock having a square cross section or a cross section of any geometry which would allow its interposition in the keyways 96, 97 of cutting bar 46 and toroidal tool holder 52, respectively. It is by use of this key 98 that the torque of the rotating cutting bar 46 is transmitted to the toroidal tool holder 52. Those familiar with this type of moveable key or spline driving will readily recognize that a key or pin of almost any geometry, conforming to a cutting bar keyway and a toroidal holder keyway, would be suitable.

The remaining feature of the cutting bar 46 is seen in the entire overview of FIG. 4. At a multiplicity of points in the bar, diametrical chambers 54, not necessarily parallel as herein shown, have been created so as to receive therethrough the full length of cutting tools 93. A reference to section A—A illustrates how cutting tool 93 is retained in chamber 54 and held therein securely by the setting of one or more set screws 100 into the threaded set screw receiving holes 102. The novel combination of tool holding diametrical chambers 54 in cutting bar 46 and toroidal tool holder 52 allow a wide range of cutting diameters to be entertained by users of the instant invention. The bar and tool cutting system lends as unique a capability to the invention as does the portable, truly versatile means for aligning, translating and driving the cutting bar 46.

Figure 5:
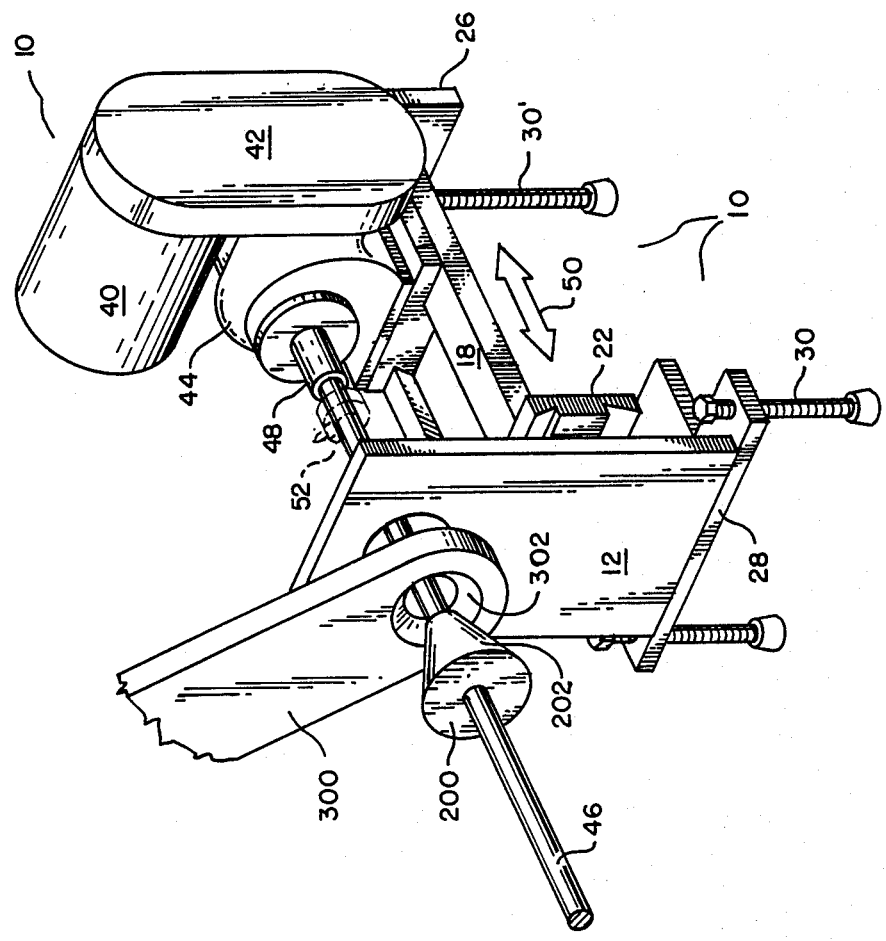
FIG. 5 is an isometric view of the alignment procedure of the main jig.

The isometric illustration of FIG. 5 discloses the operational setup and alignment assembly for driving cutting bar 46. The reader will note here that the invention 10 is set up to bore the worn bearing sleeve 302 of the partially viewed loader arm 300. In the proper setup sequence, loading bar 46 would be set up with alignment cone 200 mounted thereon and with the bar placed through the worn bearing bore or sleeve 302. Normally, a cone would be set on the bar to align the bar with the outer bushing or sleeves only. If the use of the cones will not allow a proper alignment using the outer bushing or sleeves, it follows that any internal bushing, sleeve or bore may be used for the alignment process by merely placing an alignment cone on the shaft in the appropriate location. There are other means available for aligning a bar concentrically with the bushing, bore or sleeve alignment axis; however, the instant inventor has found the use alignment cones 200, which can be manufactured quite simply, to be the most expeditious and accurate means of determining the true alignment axis.

Once the bar is aligned in the multiple bushings, bores or sleeves of the workpiece, the main jig assembly 10 is positioned at the end thereof, as disclosed in FIG. 5. Insertion of cone 200 apex 202 firmly into sleeves 302 thus truly orients the bar, coincidentally, with the bore alignment axis. Thereafter, azimuthal orientation and alignment of the drive saddle 18 translational axis 50 is made using horizontal and vertical translation tables 22, 24 (not shown). The reader may also note that since main jig base plate 12 is not bolted to the loader arm 300, or any other portion of the workpiece, stability as well as azimuthal motion is attained using rear jig subassembly 26 on its unitary jack 30'. Having made the proper alignment, the operator has but to connect the bar 46 to the drive gear set 44 by use of adaptor 48. Also shown in FIG. 5, in phantom, is the offset toroidal tool holder 52. Like the alignment cone 200, a cutting tool 93 or a cutting tool holder 52 may be preset into and/or onto the cutting bar before the alignment process begins. Once complete alignment has been achieved and the boring process is to be commenced, the alignment cones are merely slid along the bar, out of the way, and the bar is either advanced or withdrawn along the bore common alignment axis until the tool 93, irrespective of its mounting, engages the workpiece bore.

In order to acquire the fullest flexibility in boring, reaming or honing, while still using the conventional cutting tool 93, the inventor devised the toroidal tool holder 52 which is the subject of illustration of FIGS. 6, 7, 8 and 9. FIG. 6 is a view of the toroidal surface of the tool holder 52. Clearly evidenced is keyway 97 which will be superposed keyway 96 of cutting bar 46 and into which will be inserted key 98. The viewer might imagine FIG. 6 rotated 180° and, ignoring the pictorial dimensional differences, view it over section A—A of FIG. 4 so that keyways 96, 97 are juxtaposed. It may be readily discerned, then, that rotation imparted to bar 46 will be translated to holder 52 by the snugly captured key 98. It becomes readily apparent, therefore, that the inventor is not restricted from using a geometry other than the (cross sectional) square of key 98, as shown in FIG. 4. Returning to FIG. 6, the reader will observe tool holder subassembly 94, in phantom, holding tool 93 in a captive relationship. Reference to FIG. 7, a side view of FIG. 6 discloses the component parts of tool holder subassembly 94; while a co-reference to FIG. 8 portrays, in cross sectional view, the simple capture and adjustment apparatus of subassembly 94. Tool holder subassembly 94 is either welded to toroidal holder 52 or machined as an integral part therewith. The subassembly is provided with a chamber 108 that is disposed in radial relationship with holder 52. The cutting tool 93 is firmly captured in tool chamber 108 by set screws 101 in much the same manner as set screws 100 were used to capture the same or similar cutting tool in FIG. 4, section A—A. Anvil 106, depicted in FIGS. 7 and 8, is adjusted by advance screw 104 and, with set screws 101 retracted, is used to urge the cutting tool radially outward to present more of the cutting surface of the tool to the workpiece bore. This novel mounting feature in the toroidal holder 52 allows the tool to be advanced for deeper cuts in approximately one-half mil increments (0.0005").

FIG. 9 is an isometric drawing of the toroidal tool holder 52 displaying the major components of the device. Here, the rectangular keyway 97 is seen oriented 180° from the nonintegral tool holder subassembly 94. This posturing, like that of FIG. 2, has been done for illustrative purposes only and the actual emplacement of the keyway relative to the holder subassembly 94 is generally a matter of choice. Nonetheless, it would probably be more prudent to locate the keyway adjacent the tool holder subassembly since such an arrangement would shorten the torque arm distance and, consequently, lessen the likelihood of burnishing or eccentrically cutting the interior of chamber 53.

The invention, described in detail in accordance with the inventor's preferred mode of expression, is a readily mutable agglomeration of tool holding apparatus and omni-directionally orientable drive mechanism. A variety of setups may be made by the well informed and capable machinist, as practice with the invention will demonstrate. The inventor prefers to illustrate his discoveries in the simplest mode of mechanization, but neither teaches nor implies, nor should there be inferred, any limitations thereto; the invention with its fullest implications for application and operation being secured by the hereinafter appended claims.

What is claimed:

1. A portable boring apparatus for in-situ hole boring in a work piece comprising:
   a jig assembly having thereon a translation platform for advancing and retracting a rotating elongate bar and further said platform moveably mounted on orientation means so that said translation platform may be vertically and horizontally referenced in relation to a work piece, said orientation means comprising a horizontal translation table coupled by suitable means to a vertical translation table; and
   an elongate bar having therein means for holding cutting tools.

2. The invention of claim 1 further comprising motive means for rotating said bar, said motive means mounted on said translation platform.

3. The invention of claim 2 wherein said orientation means further comprises a jig subassembly having therein jacking means and fixedly connected to said translation platform.

4. The invention of claim 1 wherein said orientation means further comprises jacking means coupled to said translation tables.

5. The invention of claim 1 wherein said means for holding further comprises a multiplicity of diametrical transverse chambers in said bar.

6. The invention of claim 5 wherein said means for holding further comprises at least one orientation and torque-transferring means longitudinally disposed within said bar for orienting and transferring torque therefrom to a tool holder.

7. The invention of claim 6 further comprising a tool holder composed of a toroidal base with a projecting tool-mounting subassembly for disposition on said bar, said tool holder oriented on said bar and receptive of torque through said torque transferring means.

8. The invention of claim 1 further comprising portable journal bearing means, said means adapted for clamping or tack welding to bearing mount surfaces such as track flanges, loader arms and the like.

9. The invention of claim 8 wherein said journal bearing means comprises a portable adjustable jig-mounted pillow block which acts as a bearing for journaling therein said cutting bar.

10. The invention of claim 8 wherein the journal bearing means comprises a pillow block for journaling therein said cutting bar.

11. A portable boring apparatus for in-situ reestablishment of true coaxially aligned bores in a workpiece comprising:
- a main jig which further comprises a main jig base plate adapted for clamping, bolting or tack welding to a work piece, said base plate having mounted thereon at least two translation tables which comprise a translation subassembly, one surface of which is able to effect two orthogonal translational motions relative to said base plate, a drive saddle rigidly fixed to a surface of the translation table and perpendicularly disposed therefrom and a drive table adapted for attachment to said drive saddle and translation therealong, said drive table affording platform means for the mounting thereon of a drive motor and gearing for the imparting of the rotary output of said drive motor in axial alignment with said perpendicular disposition of said drive saddle;
- a cutting bar connected to said output by an adaptor and comprising tool holding means adapted to hold more than one tool for the engagement of a cutting tool with a work piece; and
- at least one pillow block assembly for journaling therein said bar, whereby when said cutting bar is attached to said main jig by said adaptor to acquire rotation about its longitudinal axis, said rotation provided by output of said drive motor and said rotating bar also journaled in at least one pillow block and having suitable tools installed in said tool holding means, said cutting tool rotated by said cutting bar while said bar is translated on said drive saddle to engage a work piece and bore, by the action of said tool cutting, a circumferential path as it advances by the action of said drive table translating along said drive saddle.

12. The invention of claim 11 further comprising a secondary jig mounting for said pillow block, said secondary jig further comprising a tripod base to which is mounted a horizontal and vertical translation subassembly, at least one surface of said subassembly adapted for mounting thereto said pillow block.

13. The tool holding means of claim 11 further comprising a toroidal body adapted for slidable mounting on said bar, said body having therein a key-receiving keyway for temporary rigidly affixing said body to said bar, and further comprising a cutting tool holder which projects perpendicularly from said body's toroidal plane.

* * * * *